United States Patent [19]
Pai

[11] Patent Number: 5,809,991
[45] Date of Patent: Sep. 22, 1998

[54] ASH COLLECTOR ASSEMBLY FOR A BARBECUE BOWL

[76] Inventor: Jui-Terng Pai, No. 617, Sec. 4, Chung Hwa Rd., Hsinchu, Taiwan

[21] Appl. No.: 947,437

[22] Filed: Oct. 8, 1997

[51] Int. Cl.⁶ .................................................. F23J 1/00
[52] U.S. Cl. .......................................... 126/242; 126/245
[58] Field of Search .................................. 126/242–245, 126/25 R, 25 B, 9 R, 146

[56] References Cited

U.S. PATENT DOCUMENTS

| | | | |
|---|---|---|---|
| 4,184,474 | 1/1980 | Pulliam et al. | 126/146 |
| 4,966,126 | 10/1990 | Wu | 126/25 R |
| 5,036,832 | 8/1991 | Schlosser | 126/243 |
| 5,471,916 | 12/1995 | Bird et al. | 126/25 R |

*Primary Examiner*—James C. Yeung
*Attorney, Agent, or Firm*—Michael A. O'Neil

[57] ABSTRACT

An ash collector assembly includes a ring member rotatably received in a catcher member which is attached to a bottom of a barbecue kettle, and an operation bar extends through a slot defined in the catcher member and is connected to the ring member. The catcher member has a plurality of holes. The slot and the holes are defined in a peripheral wall thereof which extends from a bottom of the catcher member. The ring member has a plurality of second holes and an aperture defined therethrough so that the operation bar extends through the slot and the aperture and is connected to a nut disposed to an inner periphery of the ring member. The ring member is moved within the catcher member by shifting of the operation bar and a size of each of the first holes are controlled by the ring member.

8 Claims, 5 Drawing Sheets

ASH COLLECTOR ASSEMBLY FOR A BARBECUE BOWL

BACKGROUND OF THE INVENTION

1. Field of the Invention

The present invention relates to an ash collector assembly and more particularly, to an improved ash collector assembly for a barbecue bowl. The ash collector is operated without closing openings defined in a bottom of the kettle.

2. Brief Description of the Prior Art

A conventional ash collector assembly is shown in FIGS. 1 and 2 and is disposed to a bottom of a barbecue bowl 30 which has five openings 31 defined in the bottom thereof so that debris, ash, pieces of food being cooked and chunks of fuel might fall into the ash collector assembly via the openings 31. Two slots 32 are defined in the bottom of the barbecue bowl 30 for engagement with the ash collector assembly. The ash collector assembly includes a disk 10 through which five holes 11 are defined and a catcher member 20. The disk 10 has an operation rod 12 connected to a center thereof so as to be pivotally connected to a center of the bottom of the barbecue bowl 30. The catcher member 20 has a bottom with a peripheral wall extending from the bottom, a plurality of second holes 21 and a recess 22 respectively defined in the peripheral wall and an upper edge of the peripheral wall. A handle 23 is disposed laterally to the peripheral wall and two protrusions 24 extend laterally and outwardly from the upper edge of the peripheral wall so that the catcher member 20 is attached to the bottom of the barbecue bowl 30 by inserting the protrusions 24 into the slots 32 and then rotating the catcher member 20 to lock it in position. The operation rod 12 extends through the recess 22. During cooking, the disk 10 is rotated by shifting the operation rod 12 so as to adjust the size of the openings 32 to control air supplied into the barbecue bowl 30 as shown in FIG. 2. However, the pivotal movement of the disk 10 partially closes the openings 31 in the bottom of the barbecue bowl 30 thereby impeding the descent of the ash, the hot chunks of fuel, etc. into the catcher member 20.

The present invention intends to provide an improved ash collector assembly to mitigate and/or obviate the above-mentioned problem.

SUMMARY OF THE INVENTION

The present invention provides an ash collector assembly which comprises a catcher member and a ring member received in the catcher member with an operation bar extending through the catcher member and connected to the ring member. The catcher member has a bottom and a peripheral wall extending from a periphery of the bottom, the peripheral wall having a plurality of holes and a slot respectively defined therethrough. An engaging means is formed to the catcher member so as to be capable of being attached to a barbecue kettle.

The ring member has a plurality of second holes and an aperture respectively defined therethrough. The operation bar extends through the slot and the aperture and is connected to a nut disposed to an inner periphery of the ring member which is rotatably received in the catcher member.

It is an object of the present invention to provide an ash collector assembly detachably attached to a barbecue kettle.

It is another object of the present invention to provide an ash collector assembly for a barbecue kettle, wherein openings defined in a bottom of the barbecue bowl will not be closed during operating the ash collector assembly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
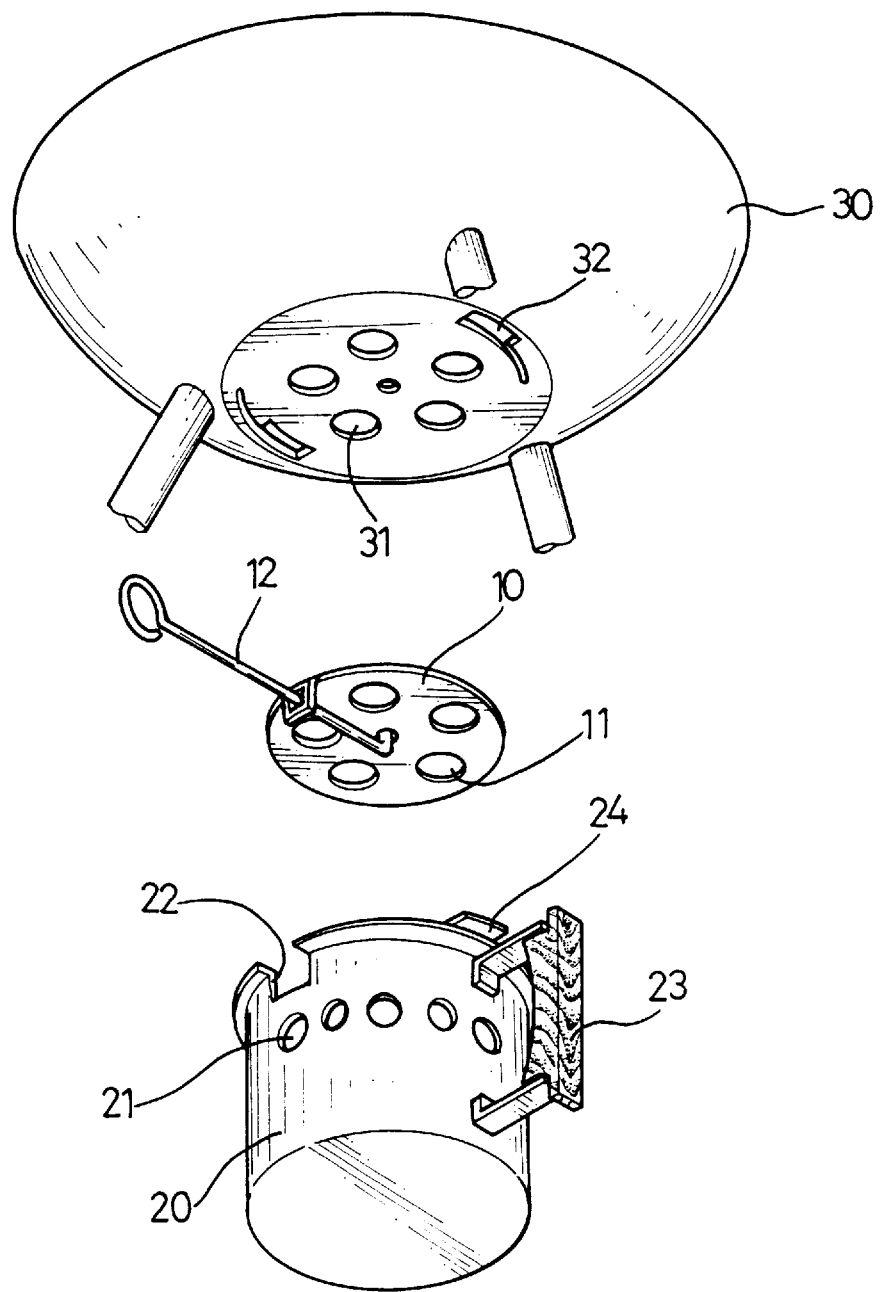
FIG. 1 is an exploded view of a conventional ash collector assembly and a barbecue kettle.
Figure 2:
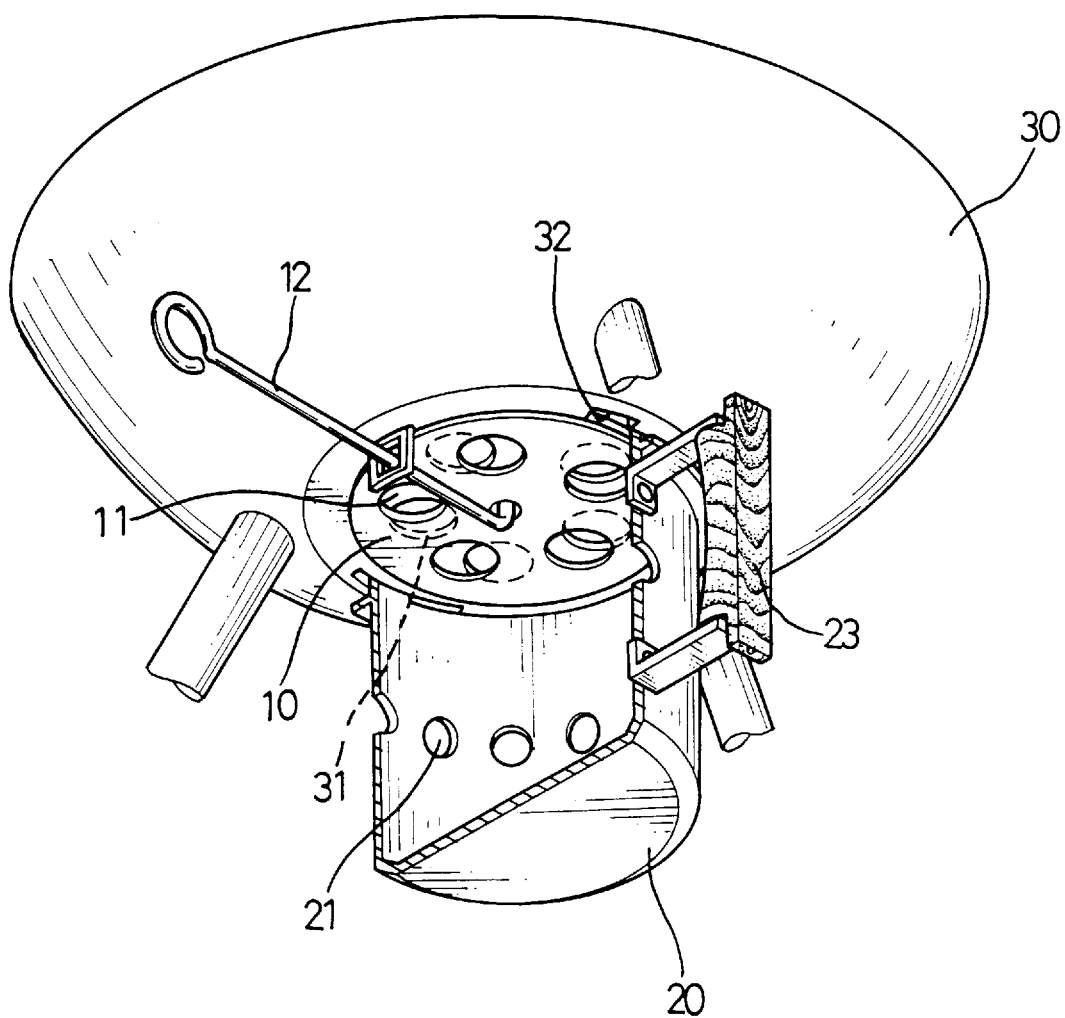
FIG. 2 is a perspective view, partly being cut away, of the conventional ash collector assembly disposed to the barbecue kettle.
Figure 3:
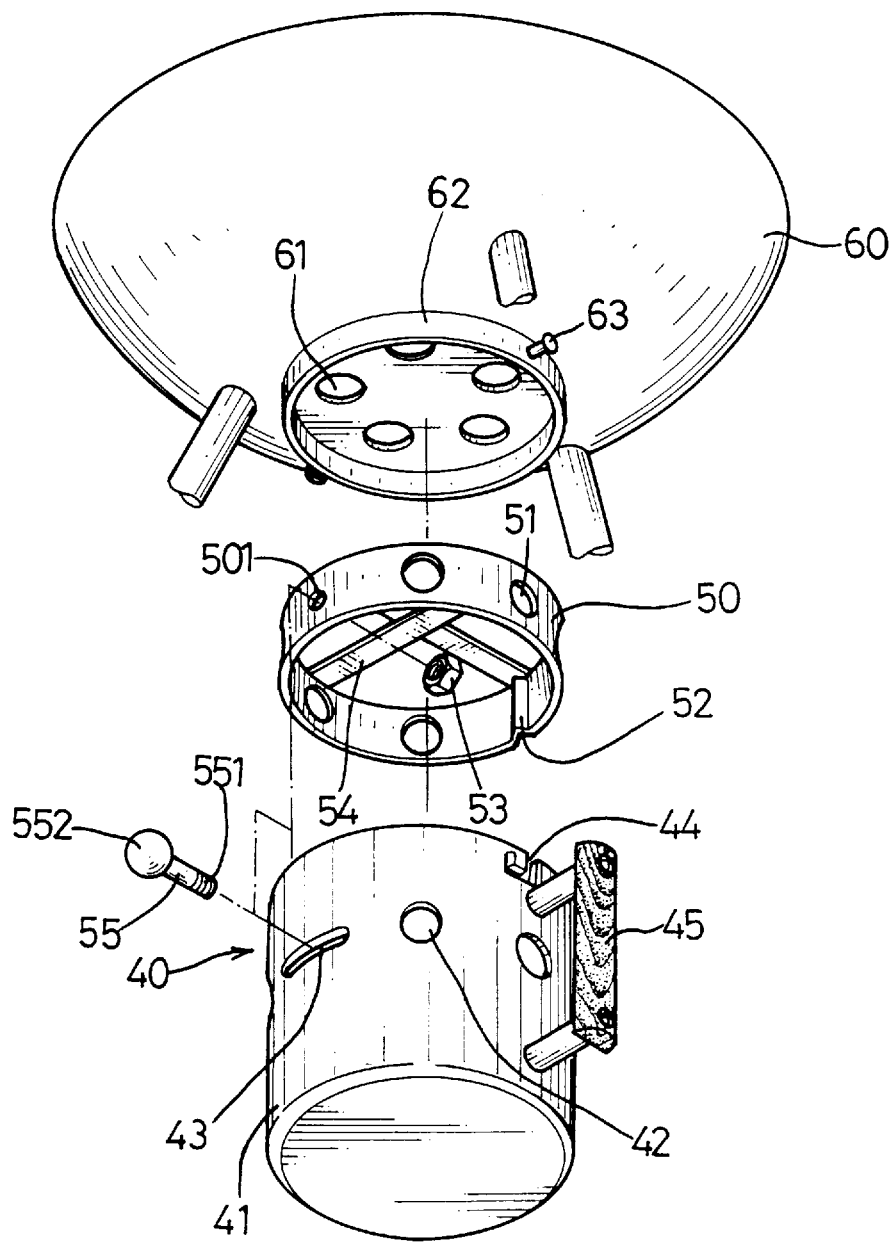
FIG. 3 is an exploded view of an ash collector assembly in accordance with the present invention.
Figure 4:
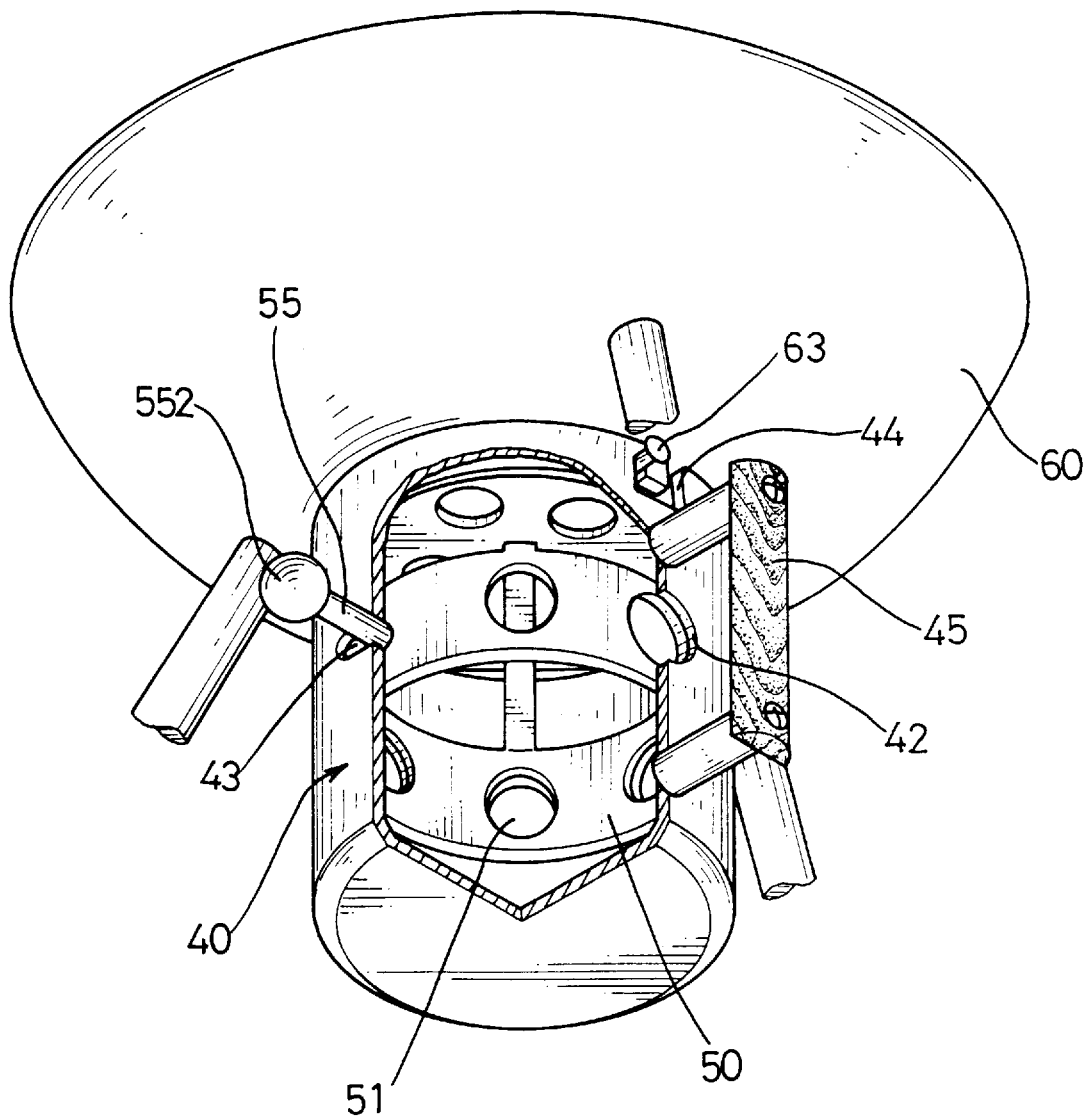
FIG. 4 is a perspective view, partly being cut away, of the ash collector assembly of the present invention attached to a barbecue kettle.

Referring to FIGS. 3 and 4, an ash collector assembly in accordance with the present invention generally includes a catcher member 40 having a bottom and a peripheral wall 41 extending from a periphery of the bottom. The peripheral wall 41 has a plurality of holes 42 and a slot 43 respectively defined therethrough at the same horizontal position of the peripheral wall 41. A handle 45 is fixedly connected to the peripheral wall 41. The catcher member 40 has an engaging means, two L-shaped recesses 44 for example, defined in an upper edge thereof.

A ring member 50 has a plurality of second holes 51 and an aperture 501 respectively defined therethrough. A portion of a periphery of the ring member 50 is pressed inwardly so as to define a v-shaped section 52 so that a slight expansion of the ring member 50 due to exposure to increased temperature can be accommodated by the v-shaped section 52. The ring member 50 further has a cross frame 54 connected within the inner periphery thereof so as to prevent possible distortion thereof through heat produced within a barbecue bowl 60.

An operation bar 55 has a first end with a threaded periphery 551 and a second end with a knob 552, the operation bar 55 extending through the slot 43 and the aperture 501 and threadedly engaged with a nut 53 disposed to an inner periphery of the ring member 50 which is rotatably received in the catcher member 40.

The barbecue bowl 60 has a plurality of openings 61 defined in a bottom thereof and a circular flange 62 extending downwardly from the bottom there of two protrusions 63 extending laterally from the circular flange 62 so that the protrusions 61 are removably received in the L-shaped recesses 44 of the catcher member 40.

Figure 5:
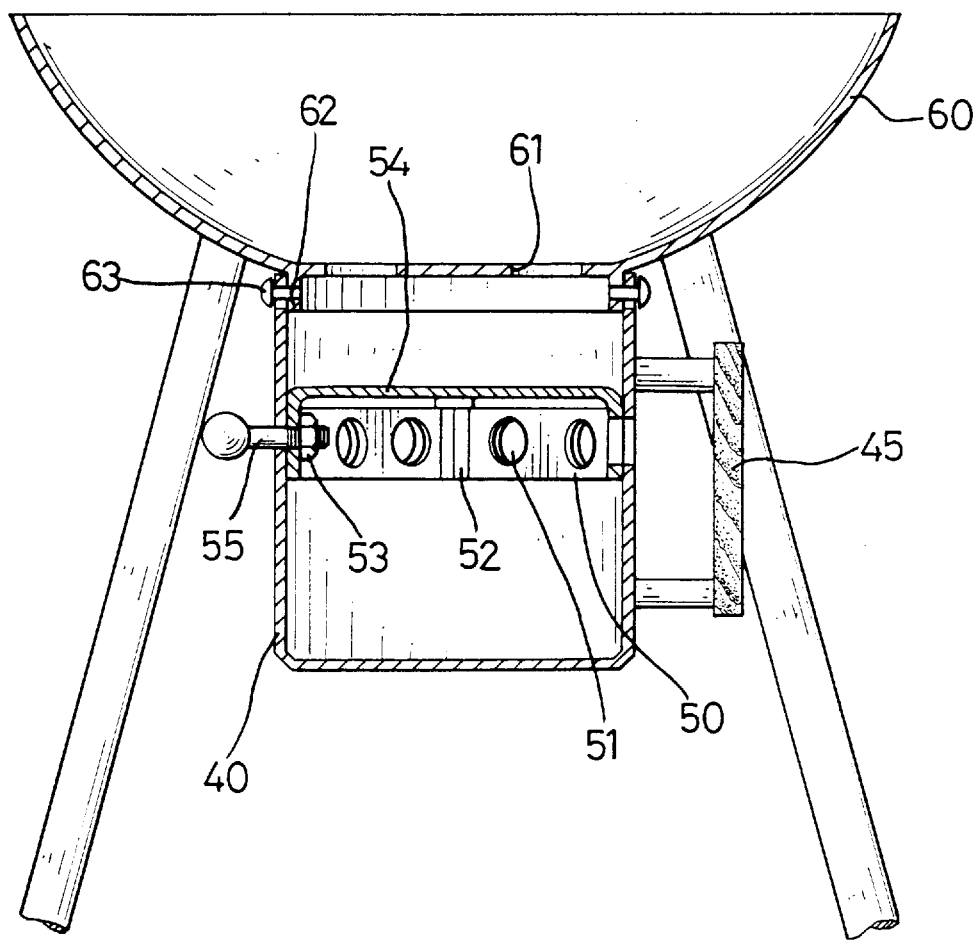
FIG. 5 is a side elevational view, partly in section, of the ash collector assembly of the present invention attached to the barbecue kettle.

Accordingly, referring to FIG. 5, when shifting the operation bar 55 within the slot 43, the ring member 50 is rotated within the catcher member 40 so that a size of each of the first holes 42 of the catcher member 40 is able to be controlled. This allows a user to control air supplied into the barbecue bowl 60 via the first holes 42 without changing a size of each of the openings 61.

Although the invention has been explained in relation to its preferred embodiment, it is to be understood that many other possible modifications and variations can be made without departing from the spirit and scope of the invention as hereinafter claimed.

What is claimed is:

1. An ash collector assembly comprising:

a catcher member including a bottom having a periphery and a peripheral wall extending from the periphery of said bottom, said peripheral wall having a plurality of holes and a slot respectively defined therethrough, an engaging means formed to said catcher members for attachment to a barbecue kettle;

a ring member having a plurality of second holes therethrough and an aperture defining an inner periphery of the ring member, said ring member having a cross frame connected within the inner periphery thereof;

an operation bar extending through said slot and said ring member and connected to a nut disposed to the inner periphery of said ring member and said ring member being rotatably received in said catcher member.

2. The ash collector assembly as claimed in claim 1 wherein said ring member has a v-shaped section formed thereto which is formed by pressing a periphery of said ring member so as to define a notch into said periphery of said ring member.

3. The ash collector assembly as claimed in claim 1 wherein said engaging means includes at least two L-shaped recesses defined in an upper edge of said catcher member so as to receive protrusions extending from said barbecue kettle.

4. The ash collector assembly as claimed in claim 1 wherein said catcher member has a handle fixedly connected to said peripheral wall thereof.

5. An ash collector assembly comprising:

a catcher member having a bottom and a peripheral wall extending from the periphery of said bottom, said peripheral wall having a plurality of holes and a slot respectively defined therethrough, an engaging means formed to said catcher member for attachment to a barbeque kettle;

a ring member having a plurality of second holes and an aperture respectively defined therethrough and having a v-shaped section formed thereto which is formed by pressing a periphery of said ring member so as to define a notch into said periphery of said ring member;

an operation bar extending through said slot and said aperture and connected to a nut disposed to an inner periphery of said ring member; and said ring member being rotatably received in said catcher member.

6. The ash collector assembly as claimed in claim 5 wherein said ring member has a cross frame connected within said inner periphery thereof.

7. The ash collector assembly as claimed in claim 5 wherein said engaging means includes at least two L-shaped recesses defined in upper edge of said catcher member so as to receive protrusions extending from said barbeque kettle.

8. The ash collector assembly as claimed in claim 5 wherein said catcher member has a handle fixedly connected to said peripheral wall thereof.

\* \* \* \* \*